United States Patent [19]
Wallin

[11] 3,914,673
[45] Oct. 21, 1975

[54] STRUCTURAL SPEED CONTROL FOR ELECTRIC MOTORS

[75] Inventor: Gus Waldemar Wallin, Waterbury, Conn.

[73] Assignee: Scovill Manufacturing Company, Waterbury, Conn.

[22] Filed: July 22, 1974

[21] Appl. No.: 490,757

Related U.S. Application Data

[63] Continuation-in-part of Ser. No. 351,806, April 16, 1973, abandoned, which is a continuation-in-part of Ser. No. 268,619, July 3, 1972, abandoned.

[52] U.S. Cl. ............... 318/325; 318/346; 318/341
[51] Int. Cl.² .................. G05D 13/10; H02P 5/30
[58] Field of Search ......... 318/325, 346, 330, 246, 318/249, 337, 541, 542

[56] References Cited
UNITED STATES PATENTS

| | | | |
|---|---|---|---|
| 129,085 | 7/1872 | Barjon | 318/346 |
| 248,434 | 10/1881 | Edison | 318/346 |
| 1,362,844 | 12/1920 | Cardoza | 318/346 |
| 2,943,252 | 6/1960 | Herrmann | 318/325 |
| 3,566,238 | 2/1971 | Akiyama | 318/346 |

Primary Examiner—B. Dobeck
Attorney, Agent, or Firm—Dallett Hoopes

[57] ABSTRACT

A speed control comprises a rotary surface having irregularly-shaped means and driven by the controlled motor. A brush assembly comprises at least part of a make-and-break circuit in series with the motor, the assembly including an engagement portion adapted to ride on the rotary surface. The brush assembly is adjustable so that the engagement portion may be placed at a setting anywhere in a path of traverse along the surface. The irregularly-shaped means causes interruptions of the make-and-break circuit as the rotary surface rotates under the engagement portion. Because of the shape of the irregularly-shaped means, the interruptions are less in extent and/or frequency if the setting is closer to one end of the path of traverse than the other end. In other words, there is more "on" time at a setting toward said one end. Hence, the speed of the motor increases at settings toward said one end. Governor means are provided to reduce the extent and/or number of interruptions when the motor speed drops under load.

41 Claims, 38 Drawing Figures

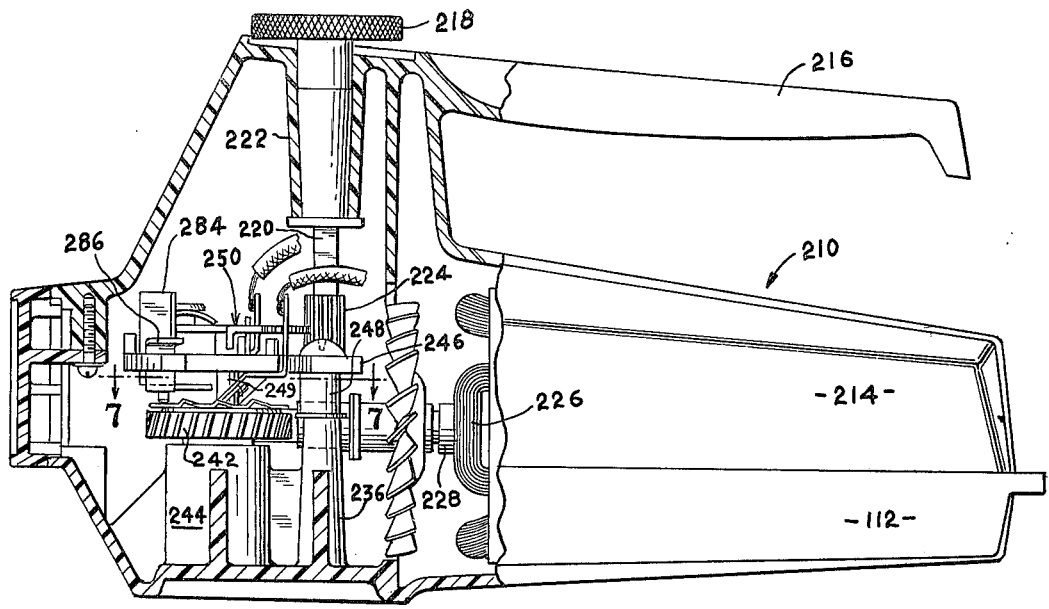
Fig. 6.
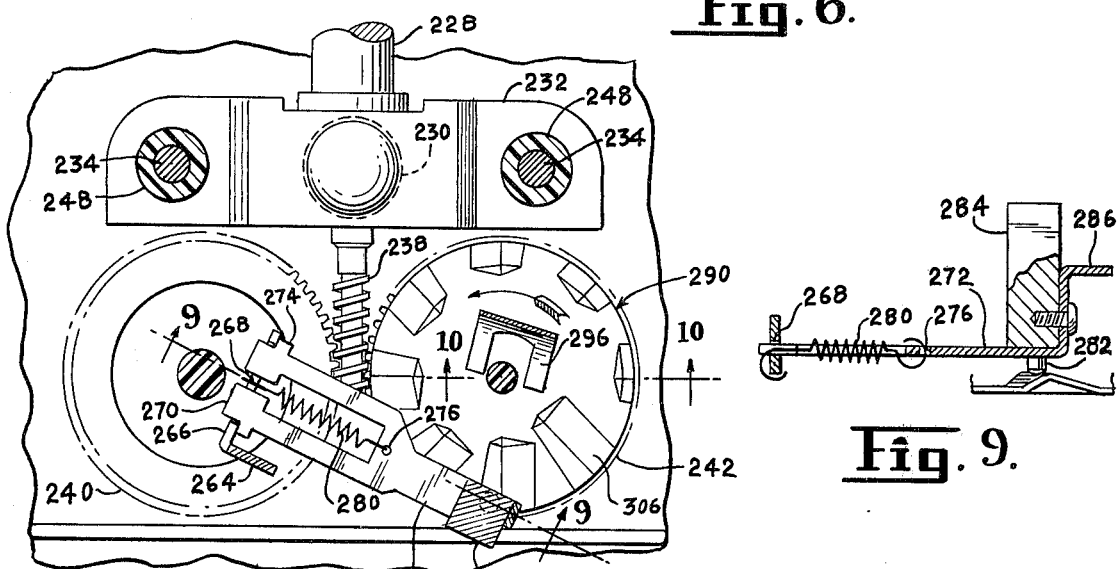
Fig. 7.
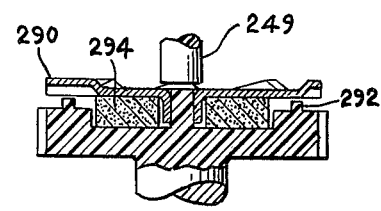
Fig. 9.
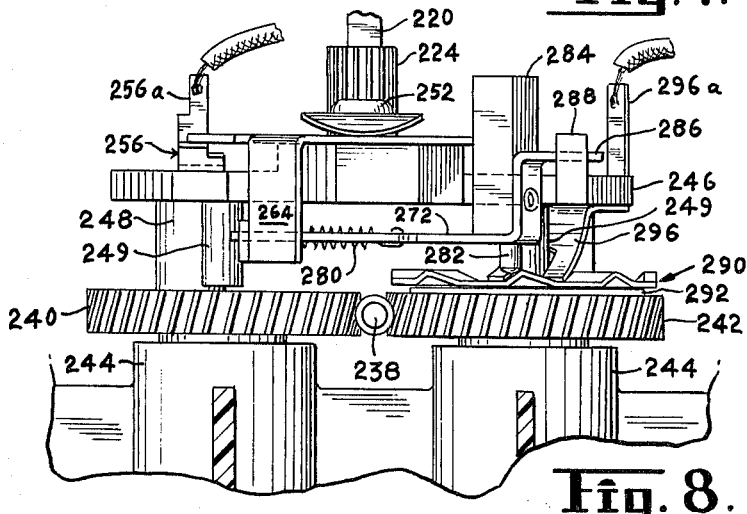
Fig. 8.
Fig. 10.

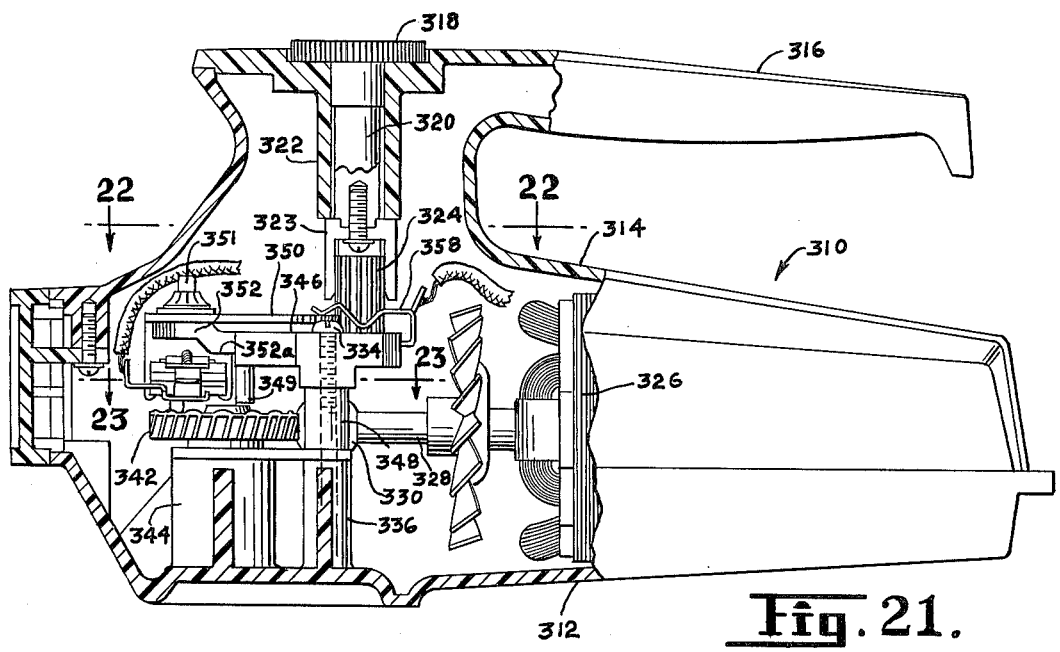

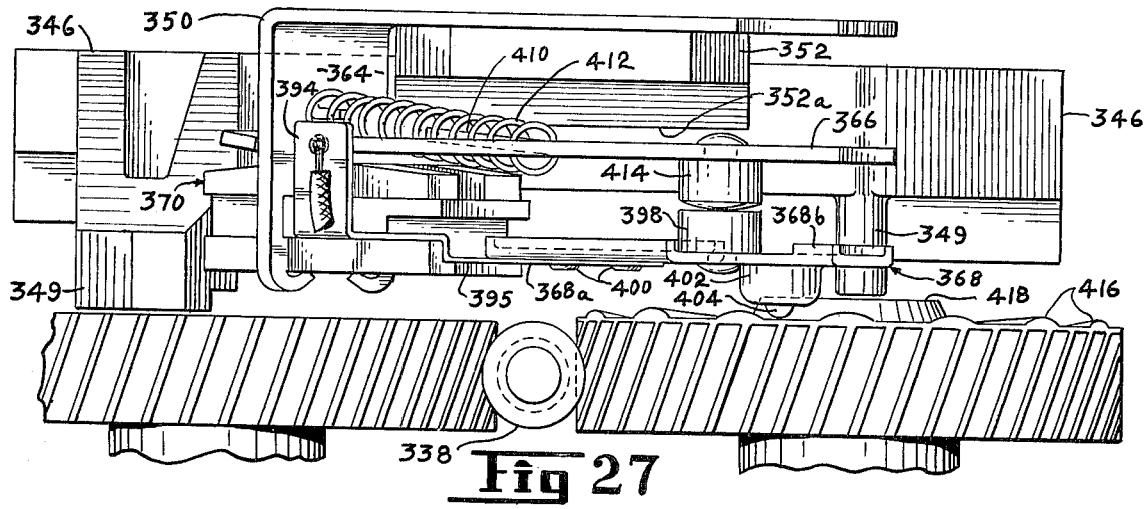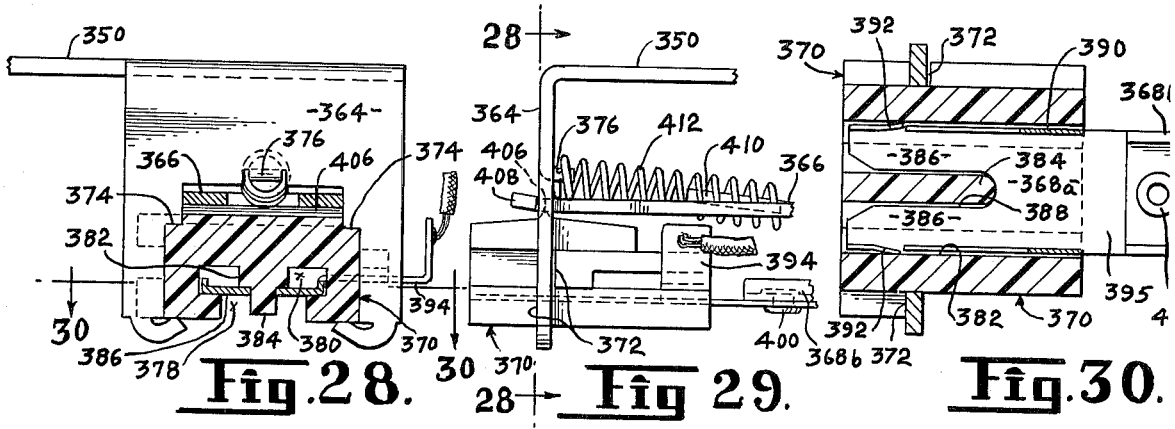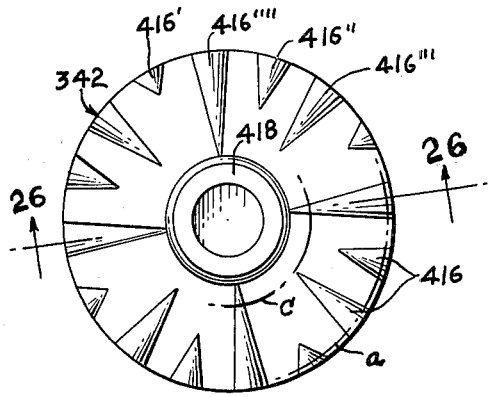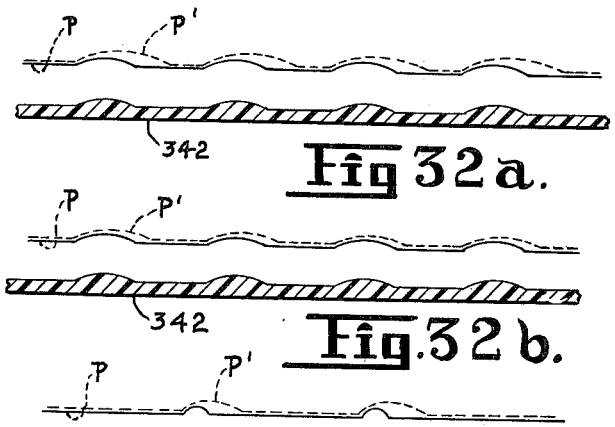

STRUCTURAL SPEED CONTROL FOR ELECTRIC MOTORS

BACKGROUND OF THE INVENTION

This application constitutes a continuation-in-part application of my co-pending application Ser. No. 351,806, filed in the United States Patent Office on Apr. 16, 1973 now abandoned which itself was a continuation-in-part application of patent application Ser. No. 268,619, filed in the United States Patent Office on July 3, 1972, and now abandoned.

FIELD OF THE INVENTION

The invention pertains to the art of electric motor speed controls and governors which interrupt the motor circuit to modifiy the electric power to the motor. Such speed controls and governors are particularly adapted for fractional horsepower motors as are used in kitchen appliances such as mixers and blenders.

DESCRIPTION OF THE PRIOR ART

Numerous patents on speed controls and governors for electric motors have issued disclosing means by which the motor circuit is repeatedly momentarily interrupted to a greater or lesser extent over a given period thereby to adjust the effective power delivered to the motor and therefore the speed.

The prior art, such as U.S. Pat. No. 129,085, suggests rotary members powered by the motor and having conductive portions on their surfaces alternating with non-conductive portions, the conductive portions being energized and configured so that as a brush or collector is moved along the rotary member, its proportionate time in which it engages the conductive portion varies to adjust the effective power going to the motor and therefore the speed.

Such speed controls have, however, been objectionable for a number of reasons. First, if the motor is stopped and the rotary member happens to be in a position in which an insulating portion engages the brush or collector, the motor will have to be jacked around in order to make contact to start it again. Further, it is possible for such motors, when running under load, to stall out if the speed drops sufficiently low so that the inertia of the motor does not carry the rotary member on to where the brush or collector again engages a conductive portion. Additionally, such speed controls have been lacking in that they provided no governor action but have simply, depending on the setting of the brush or collector, fed the motor the consequent effective power without particular notation of the speed.

Attempts have been made to rectify such dead spots and stalling. In U.S. Pat. No. 2,943,252, for instance, flying weights have, according to the speed change, moved the brush positions relative to the surface. Such devices have been awkward, difficult to make, and unreliable in operation.

SUMMARY OF THE INVENTION

Under the present invention, a kitchen mixer having a motor and a drive worm engaging a pair of oppositely rotating worm wheels, one on either side of worm, a rotary surface is provided on one of the worm wheels. The surface has conductive portions which rotate with the wheel. Manual means are provided for moving a brush in a path of traverse along the surface as it rotates under the brush, and the brush and conductive means are connected switch-fashion in the motor power line. Because the conductive means are irregular in shape and arranged so that the brush is in contact with it to a greater extent at settings approaching one end of the path of traverse, the setting of the brush controls speed of the mixer.

Also, under the present invention, there is provided a speed control and governor for motors generally and comprising a rotary member driven by the motor shaft and being conductive and formed with spaced upward protrusions. A brush assembly has a brush adapted to be manually moved along the rotary member in a path of traverse and is gently biased toward the member. The protrusions are less numerous toward one end of the path. The conductive surface and the brush are connected in series in the power line of the motor with the result that as the brush is moved along its path of traverse toward one end, the brush is more often in contact with the member and interruptions in the delivery of power to the motor decrease in frequency speeding up the motor. The device also performs a governing function in that when the rotary member slows, as under load, the surface under the brush moves more slowly and thus the brush more closely follows the profile of the member and spends more time in contact therewith to increase the effective power to the motor and thereby tend to restore the speed of the motor to a speed more consistent with that which would be expected at the setting of the brush.

Also provided herein is a speed control and governor for motors generally, and kitchen or food mixers in particular, similar to the version described in the above paragraph, but wherein the rotary member with its upward protrusions as described is not required to be of conductive material. In this latter version, the brush assembly comprises a pair of parallel upper and lower pivoted or flexible arms with contacts adjacent their free ends, the arms being mounted to move independently. The lower arm rides on the rotary member and preferably closely following its contours, and the upper arm freely rides on the lower arm in a contact-to-contact basis. The upper arm "bounces" on the lower arm as the latter lifts and lowers and this causes interruptions. This arrangement, in which the two contacts are in series with the motor, provides similar operating characteristics to the above-described version but is less expensive and the contacts may be readily replaced. The governing action as described in connection with the earlier embodiment is approximately similar to the governing action of the present embodiment because when the speed drops under load, the contact arms stay together for greater effective time, tending to restore the speed to the desired level.

DRAWINGS DESCRIPTION

Objects and features of the invention will be apparent from a reading of the following disclosure, including drawings, all of which relate to non-limiting embodiments of the invention. In the drawings:

FIG. 4 is a sectional view taken on the line 4—4 of FIG. 3;

FIG. 5a is an enlarged sectional view of the upper end of the post assembly;

FIG. 5b is a sectional view taken on the line 5b—5b of FIG. 5a;

FIG. 6 is a side elevation partly broken away and partly in section of a kitchen mixer having a speed control and governor embodying the invention;

FIG. 7 is an enlarged sectional view taken on the line 7—7 of FIG. 6;

FIG. 8 is a front end view of the speed control and governor of FIG. 6;

FIG. 9 is a sectional view on the line 9—9 of FIG. 7;

FIG. 10 is a sectional view on the line 10—10 of FIG. 7;

FIG. 21 is a side elevation, partly broken away and partly in section, of a kitchen mixer having a speed control and governor embodying a further modified form of the invention;

FIG. 22 is an enlarged sectional view taken on the line 22—22 of FIG. 21;

FIG. 23 is an enlarged sectional view taken on the line 23—23 of FIG. 21;

FIG. 24 is an enlarged top plan view of the lower contact arm;

FIG. 25 is a sectional view taken on the line 25—25 of FIG. 24;

FIG. 26 is an enlarged sectional view taken on the line 26—26 of FIG. 31;

FIG. 27 is a greatly enlarged fragmentary front end view of the speed control and governor of FIG. 21;

FIG. 28 is a sectional view taken on the line 28—28 of FIG. 29;

FIG. 29 is a side elevation of the elements shown in FIG. 28;

FIG. 30 is a fragmentary sectional view taken on the line 30—30 of FIG. 28;

FIG. 31 is a top view of a rotary member embodying the invention as shown, for instance, in FIG. 23;

FIG. 32a is a panoramic profile view taken on a plane of uniform radius at the broken line "a" of FIG. 31 and showing the relative path of the contacts relative to the surface thereunder of the wheel as the wheel rotates;

FIG. 32b is a panoramic profile view comparable to FIG. 32a but taken at the instant a significant load is applied to the mixer, reducing its speed;

FIG. 32c is a view comparable to FIG. 32a but taken at the broken line b of FIG. 31;

DESCRIPTION OF THE PREFERRED EMBODIMENTS

Figure 1:
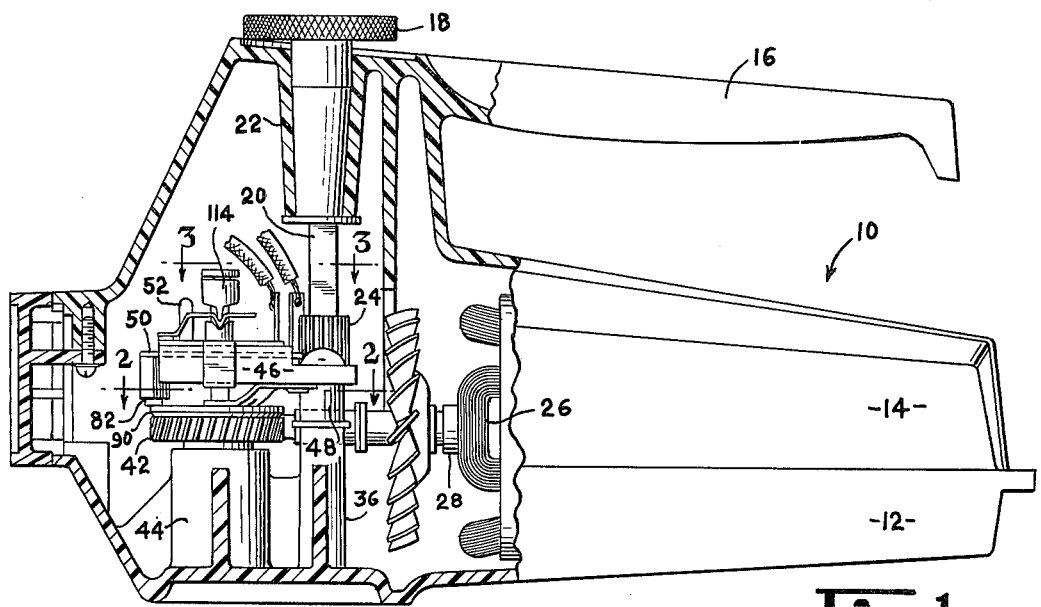
FIG. 1 shows a mixer embodying the invention in side elevation and having a portion of the housing broken away and being partly in section.

Referring more specifically to the drawings, a kitchen mixer embodying the invention is generally designated 10 in FIG. 1. It comprises a housing having a lower half 12 and an upper half 14 secured together, and handle 16. A control knob 18 mounted on the top of the unit has a shaft 20 which is journaled in a plastic hub 22 in the upper half 14. The lower end of the shaft 20 terminates in a spur gear 24 having a central upward recess.

Contained within the housing is a motor 26 having a shaft 28. The shaft has a spherical bearing (not shown) as is conventional, and is held down by a strip 32 secured by bolts 34 (FIG. 2) which are screwed into bosses 36 molded integrally with the bottom half of the housing. The shaft 28 terminates in a worm gear 38 which drives a pair of worm wheels 40, 42 on either side of the worm as is conventional. The wheels 40, 42 are integrally formed with hubs which extend into molded journals 44. The underside of the hubs receive in driving fashion the mixer beaters (not shown), as is conventional.

Figures 2, 3:
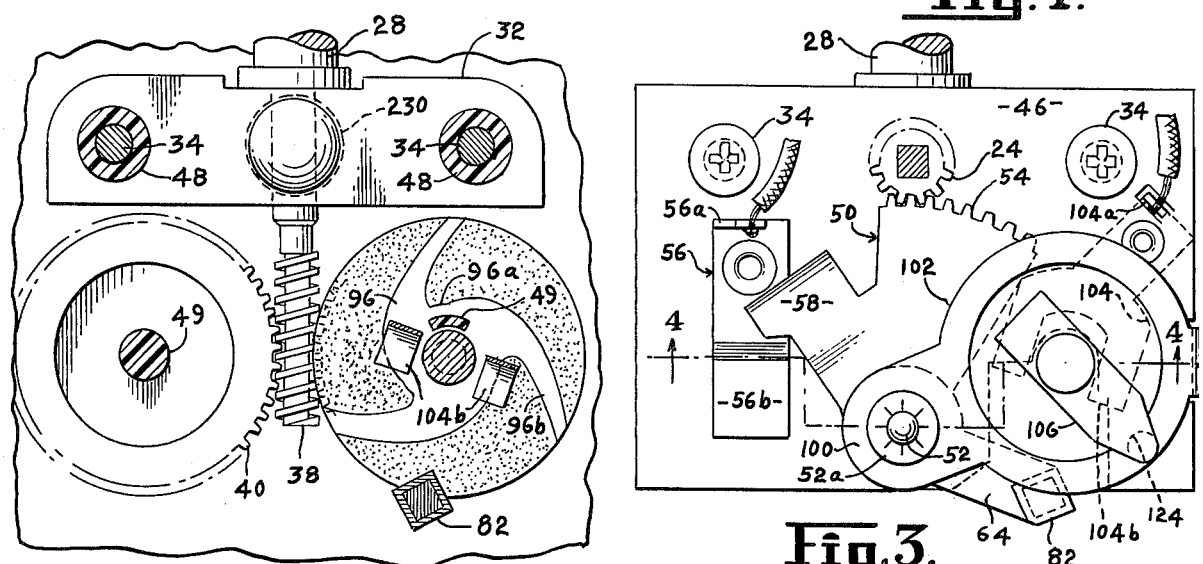
FIG. 2 is an enlarged sectional view taken on the line 2—2 of FIG. 1.
FIG. 3 is an enlarged sectional view taken on the line 3—3 of FIG. 1.

A control support board 46 of insulating material is configured as is shown in FIG. 3 and is held in place above the wheels 40, 42 by the bolts 34 equipped with spacers 48. The board has a depending pin 49 above the center of each wheel to hold it down against its upward thrust.

Mounted for pivotal movement on the board above the wheels is the brush assembly metal frame 50, preferably a brass stamping. In the embodiment shown, a pin 52 (FIG. 3) extends up from the board and is received through an opening in the frame 50 permitting oscillation of the frame thereabout. The recess in the spur gear 24 receives a steadying pin (not shown) to stabilize the lower end of the spur 24. A gear segment 54 disposed on an arc out from the pin 52 engages the spur 24 so that by turning the knob 18, the frame 50 is pivoted about its pin 52.

A spring contact strip 56 with terminal 56a is secured to the board 46 as by a rivet or eyelet, as shown. An arm 58 of the metal frame 50 engages on its underside with the upper end 56b of the contact during all but the most clockwise position of the frame 50, as shown in FIG. 3.

The frame, as shown, is provided with an arm 64 which carries on its end a depending pick-up brush or collector 82.

Figures 4, 5A, 5B:
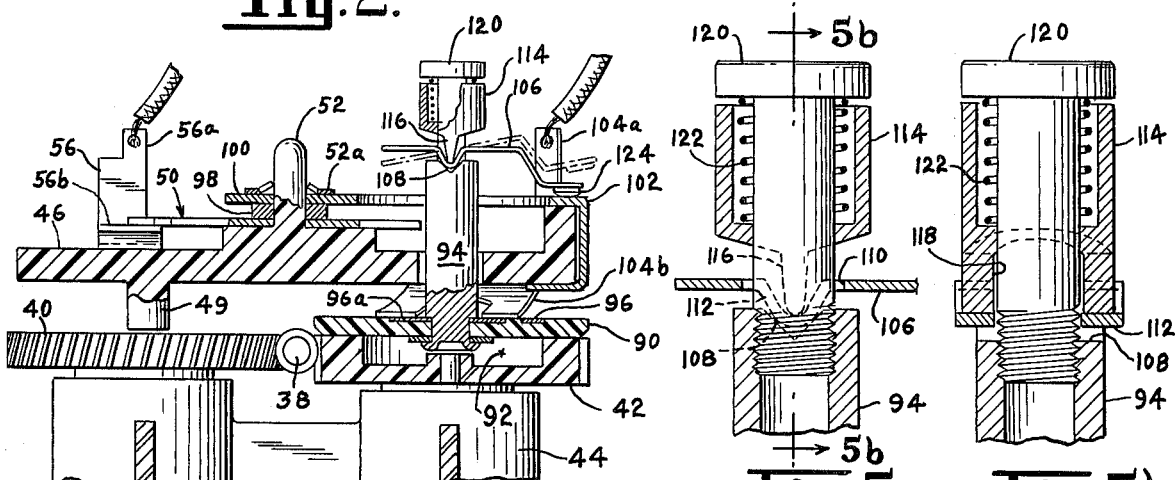

Disposed under the brush assembly described above is the wheel 42 which mounts a rotary surface in the form of disc 90. The wheel 42, as shown, carries a central recess 92 (FIG. 4). Extending up centrally from the disc is a metal post 94 which is secured at the lower end of the disc by having its reduced end headed on the underside thereof. The board 46 is amply apertured for the post 94. On its upper surface, the disc 90 is of insulating material but carries a star-shaped insert 96 of metal which centrally engages the metal post 94. The insert 96, as shown, has a central annulus 96a and outward arms 96b which preferably thin as the periphery of the disc 90 is approached.

A brass contact washer 98 is disposed on the pin 52 above the metal frame 50. Disposed above that is an apertured ear 100 of a ring in contact element 102. A retaining washer 52a holds the parts down on the pin. The ring portion of the element 102 surrounds the post 94 concentrically and extends down around the board 46 (FIG. 4).

A contact strip 104, having an upward terminal 104a extending upward through an opening in the board 46, is secured to the board and terminates in downward contacts 104b which engage the ring portion 96a of the insert in rubbing engagement.

As shown in FIG. 4, the upper end of the metal post 94 carries a swinging contact arm 106 in a manner which keeps its movement keyed to the rotation of the post 94 as the disc 90 rotates with wheel 42, but permits its limited pivoting about a horizontal axis. This is achieved, as shown in FIG. 4, by having a diametrical groove 108 formed in the top of the post 94, and the post centrally drilled and tapped. As shown in FIG. 5a, the arm 106 has an opening 110 and a pair of downstruck depressions 112 on either side of the opening thereof. A cup 114 has depending nibs 116 and a central opening 118 in its lower end. A holddown screw 120 is provided which extends down through the openings 118 and 110 and into the post 94. As shown, a spring 122 surrounds the screw 120 inside the cup 114 and serves loosely to hold down the cup with its nibs 116 engaging in the depressions 112, pressing them lightly into the groove 108 and making electrical contact therewith.

The distal end of the arm 102 carries a hardened contact 124 which, at conditions of low speed or repose, engages the ring of the element 102 to establish electrical contact therewith. At higher speeds of post 94, the end 124 of the swinging arm 106 rises under centrifugal force and clears contact with the ring 102.

As shown, contact terminals 56a and 104a are connected in an interruption in the power line to the motor 26.

OPERATION

The operation of the embodiment shown in FIGS. 1 through 5b will be apparent from the structure. With the knob 18 in the position shown, and with parts as indicated in FIG. 3, the arm 58 fails to make contact with the strip 56 and the mixer is off.

Assume now that the knob 18 has been turned clockwise slightly to where the frame 50 engages strip 56. This energizes the ring 102 and completes the circuit through arm 106, post 94, section 96a, and contacts 104b to terminal 104a. This activates the motor. As rotation builds to a preestablished minimum speed, the end of arm 106 raises, breaking contact with ring 102. Above the minimum speed, the speed is controllable by the position of the brush 82 in its path of traverse: the closer toward the center of the disc 90 the brush is set, the higher the speed.

With the centrifugal switch opened at higher speeds, current to the motor depends on the circuit from contact 56, frame 50, arm 64, brush 82, insert 96, and contact 104. Current therefore will pass only during those periods in which the brush 82 engages one of the extensions 96b. Hence, at brush settings adjacent the periphery of the disc 90 there will be large interruptions in the current to the motor. As the brush 82 is moved inward by the clockwise rotation of the knob 18, the conductive arms 96b cover a greater portion of the total annular line on the disc engaged by the brush and provide a greater ratio of "on" time to "off" time compared to the more outer settings of the brush. The inner settings thus give greater effective power to the motor and increase its speed. When the brush 82 is set inward to the ring portion 96a, there is steady power provided to the motor and the speed is maximum.

The mixer may be turned off by rotating the knob 18 counterclockwise to the extreme so that the arm 58 no longer engages contact 56. Stops (not shown) limit the rotation of the knob 18 in either direction.

Even at higher speed settings of the brush 82, the centrifugal switch 106, 108 may be called upon to act as the motor encounters a heavy load. For instance, with the brush set halfway towards the center of the disc 90, speed might be in the neighborhood, under no load, of 550 rpm. Were the beaters of the mixer at this setting suddenly thrust into a heavy pudding, the speed would drop and there would be a chance of the beater stalling out with the brush 82 getting caught between the arms 96b. The presence of the centrifugal switch 106, 102, however, avoids this. Upon drop in speed to a speed below the factory-related minimum, the arm 106 drops, establishing a rubbing contact with the ring 102 and by-passing the brush 82 and arms 96b to provide a sustaining activation of the motor.

Thus, under load conditions at any setting of the brush 82, if the speed drops below the factory-selected minimum the motor receives full energization and complete power giving it unusually high torque at slow speeds. This high torque compares with the maximum torque available at highest speed in the usual mixer speed control arrangement which is based on a multiple position switch connected to various taps of a tapped field winding. Such controls are comparable in cost to the present arrangement, but at the slow speed setting, such multi-tapped-field mixers have extremely low torque.

With any mixture, the housewife will appreciate the availability of lower speeds, 300 rpm under the present embodiment, for instance, as compared with a 450 rpm bottom in the tapped field control. She will also appreciate the availability of high torque at low speed settings. Where she is making cookie dough, for instance, the housewife will desire to blend flour into the already creamed butter and sugar and eggs at low speed to avoid projecting flour about the surrounding area. As she adds flour, the blend suddenly becomes thick, greatly increasing the power required to drive the beaters. Using a tapped field control, the housewife has thereupon had to adjust the speed setting to "high" to maintain speed or avoid stalling. With the control of the present invention, the centrifugal switch 106, 102 automatically supplies the needed power. Thus, the present control offers the characteristics of a centrifugal speed control, but at a fraction of the cost.

A reasonable variation of the embodiment described above would be to eliminate the centrifugal switch 106, 102 and to provide other means for avoiding the stall or the "dead spot start" when brush 82 is between extensions 96b of insert 96. Under the shown insert configuration, the arm 64 may be pivoted off a dead spot by moving it to contact with the nearest non-radial extension 96b. Otherwise, such means could take a large variety of forms: for instance, a by-pass switch in or near the speed control which would by-pass the brush 82 and insert 96 for an instant at start. Such means could also take the form of providing a continuous annular conductive band as part of the insert at the periphery of the disc, which band is traversed quickly by the brush in starting the motor and is disposed prior to the slow speed brush setting. While such variations are within the scope of this invention, the FIGS. 1–5b version with the centrifugal swtich is highly preferred.

It is also envisioned "rotary the rotary member" could be in the form of a drum with a suitably configured conductive insert on its periphery rather than the disc, such as 90, proposed in the preferred embodiment. The disc is preferred primarily because at the present time it is less expensive and easier to produce.

OTHER EMBODIMENTS

Referring more specifically to the drawings, a mixer embodying the invention is generally designated 210 in FIG. 6. It comprises a housing having a bottom portion 212 and an upper portion 214 including a handle 216. A control knob 218 mounted on the top of the unit has a shaft 220 which is journaled in a plastic hub 222 in the upper portion 214. The lower end of the shaft 220 terminates in a spur gear 224 having a central upward recess on its lower surface. The portions 212 and 214 are held together by screws, not shown.

Contained within the housing is a motor 226 with external cord (not shown) and having a shaft 228. The shaft has a spherical bearing 230, as is conventional, which rests on a plastic block (not shown) and is held down by a strap 232 secured by bolts 234 which are screwed into bosses 236 molded integrally with the bottom portion of the housing 212. The shaft 228 terminates in a worm gear 238 (FIG. 7) which drives a pair of worm wheels 240, 242, as is conventional. The wheels 240, 242 are integrally formed with hubs which extend into molded journals 244. The underside of the hubs receive in driving fashion the mixer beaters (not shown), as is conventional.

A control support board 246 of insulating material is configured as shown in FIG. 4, and is held in place above the wheels 240, 242 by the bolts 234 equipped with spacers 248. The board is equipped with an upward steadying pin (not shown) which is received into the recess at the lower end of the spur gear. It is also provided with a downward pin 249 over each worm wheel to hold it down against upward thrust.

Mounted for pivotal movement on the board above the wheels is the brush assembly frame 250. The frame 250 is apertured in line with an aperture in the board 246, and held in supporting pivotal relation thereto by an eyelet 252. Formed on a margin of frame 250, defined by an arc swung out from an axis of rotation, is a gear segment 254 which engages the spur 224. By this means, the turning of the control knob 218 pivots the frame 250 about its eyelet 252.

Figure 11:
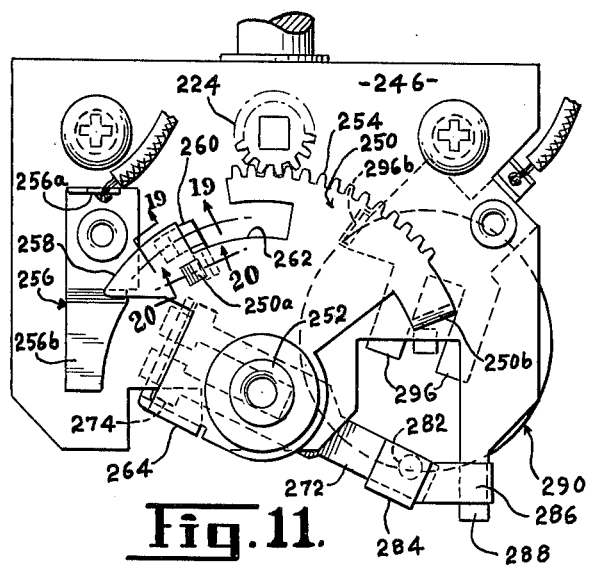
FIG. 11 is a top view of the speed control showing the speed control set at a low speed.
Figure 20:
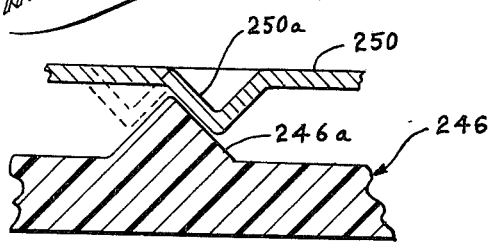
FIG. 20 is an enlarged sectional view taken on line 20—20 of FIG. 11.

A spring contact strip 256 having terminal 256a is secured to the board 246 and an arm, sectored as at 258, of the frame 250, engages on its underside the upward end 256b of the contact during all but the most clockwise position of the frame 250, as shown in FIG. 11. A stop 260 extends upwardly from the board 246 and is received into an arcuate opening 262 in the frame, the ends of which engage the stop 260 to define the clockwise end of the pivotal travel of the frame. As shown, the stop is provided with a shelf 260a to the cam frame 250 up and away from strip 256 to position. Detent nib 246a is provided (FIG. 20) to frictionally engage a dimple 250a on the underside of the frame 250 in its most clockwise position to retain it there against accidental turning in a counterclockwise direction and to define a pronounced "off" sense when the knob 218 is turned to its extreme low setting. A downturned ear 250b is formed at the end of segment 254.

Figure 18:
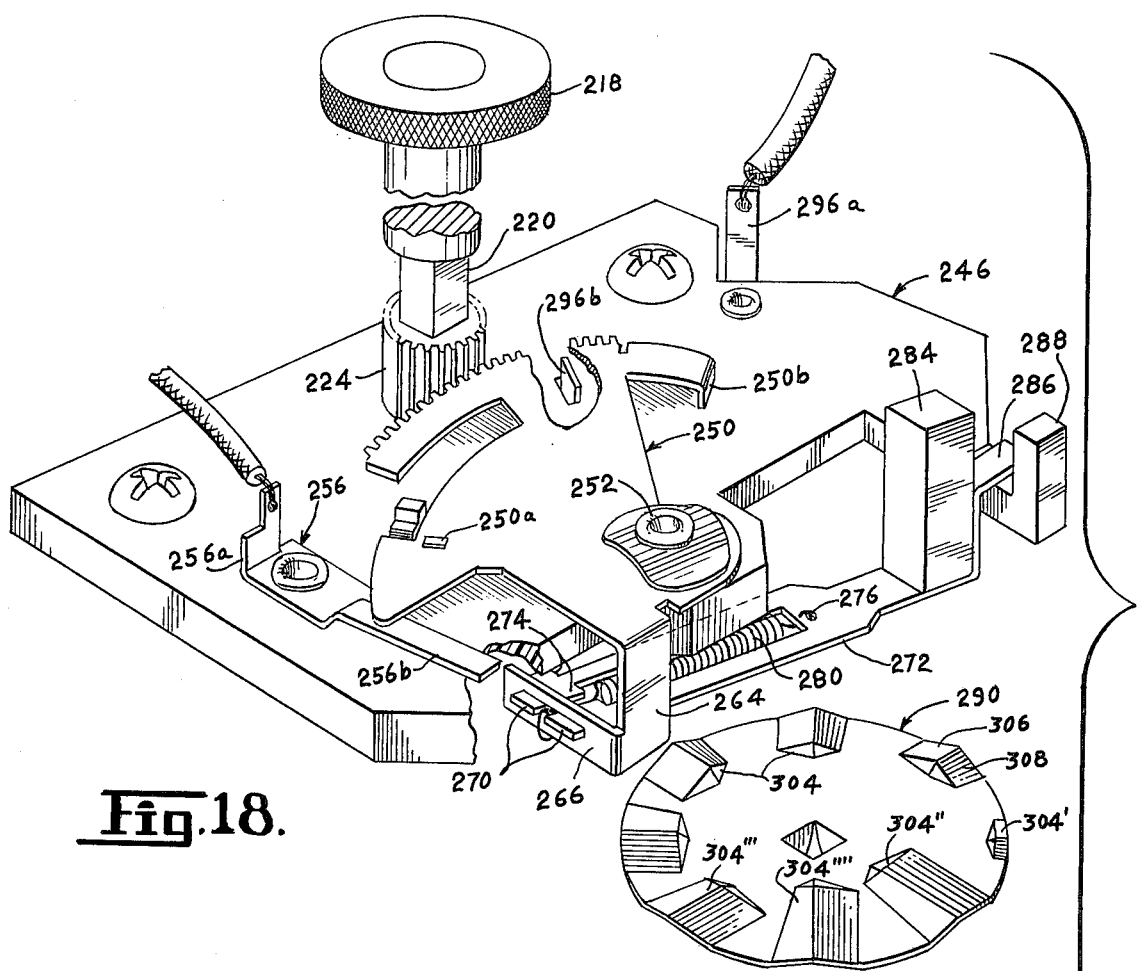
FIG. 18 is an enlarged perspective view, partly exploded, showing the speed control of the invention.

The frame 250, as shown in FIG. 18, is provided with a downward arm 264 which extends down on beyond the underside of the board 246 and has a rearwardly directed ear 266 which extends perpendicularly to the arm 264. The ear 266 is slotted longitudinally as at 268, as shown best in FIG. 7, and receives the reduced end 270 of a bifurcated conductive arm 272. At the reduction adjacent the end, the arm is formed with shoulder 274 (FIG. 7) which butt against the metal of the finger 266 permitting the arm a free pivoting action about the horizontal axis defined by the slot 268.

As shown in FIG. 9, the arm is apertured at 276 and the ear 266 has slot 268, also an aperture, and a tension spring 280 is hooked in the two apertures to bias the end of the arm 270 with its shoulders resting against the ear 266 in secure electrical contact.

The distal end of the arm 272 carries a depending brush or collector 282 of suitable material and has mounted on it a weight 284 of brass, for instance. The brass weight, which may weigh five grams, gently biases the arm downward. The spring 280, being on the centerline of the arm, has virtually no vertical biasing effect. The end of the arm 272 extends upward along the weight 284 to help cradle it and terminates in an outward run 286 which, under certain circumstances, provides a stop for the downward movement of the arm as it engages the board 246. An upward stop 288 on the board 246 limits the pivoting movement of the arm when the stop 288 is engaged by the run 286 (FIG. 11).

Disposed under the brush assembly described above is the wheel 242 which mounts a rotary member or surface in the form of a disc 290. For sound reducing purposes, the disc 290 is actually held above the surface of the gear 242 by circumferentially distributed upward nibs 292 and by a resilient pad 294 disposed in a recess in the top of the gear.

The central portion of the disc 290 has a somewhat flat surface. Secured to and depending from the underside of the board 246 is a bifurcated brass contact 296 supported on the board. The lower ends of the contact wipe the disc 290, as shown in FIG. 7, and the upper end extends upward and terminates in a terminal 296a. A tab 296b from the contact extends upward through an aperture in the board (FIG. 18).

The power line for the motor is interrupted, as shown in FIG. 18 and the two ends are connected respectively to the terminals 256a and 296b. This, in effect, makes the arm 272 with its brush 282 and the disc 290 a switch, interrupting the motor circuit when the brush 282 disengages the disc 290.

Figure 12:
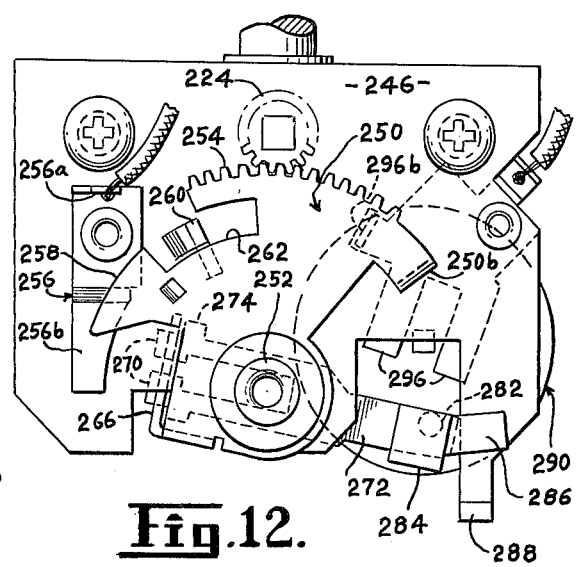
FIG. 12 is a view similar to FIG. 11 but showing the speed control set at a higher speed.
Figure 13:
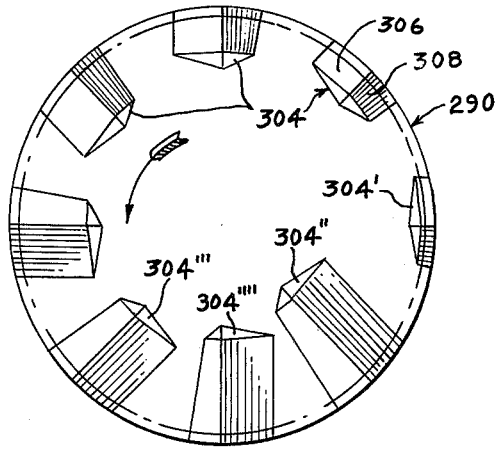
FIG. 13 is an enlarged top view of the rotary member of FIG. 12 indicating in dotted lines the path of the brush or collector relative to the member.
Figure 19:
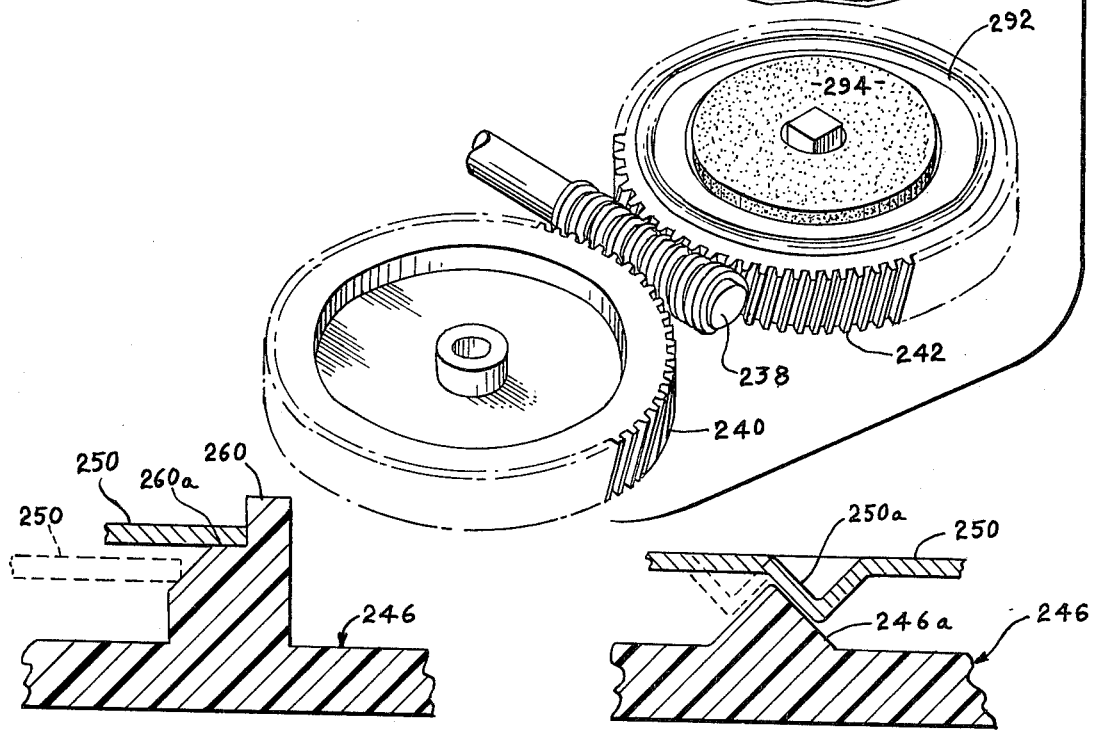
FIG. 19 is an enlarged sectional view taken on line 19—19 of FIG. 11.

As is illustrated in FIGS. 11 and 12, the rotation by the control knob 218 of the frame 250 causes the brush 282 to move in an arcuate path of traverse generally from the periphery of the disc 290 towards the center. Movement of the frame to the position shown in FIG. 11 where the sector 258 is not in engagement with the upper end 256b of the strip 256 and the frame sits on shelf 260a (FIG. 19), interrupts the circuit completely and causes the motor to be "off" even though the brush 282 may be contacting the disc 290 at the time.

The attention is now directed to the nature of the disc 290. As best shown in FIG. 7, and FIGS. 13 and 14, and 18, the disc which is of copper, or other conductive material, is formed with upward protrusions 304. These protrusions preferably take the form of more or less radial ridges. Preferably, the disc 290 is stamped from sheet metal and each ridge is formed more or less with a pair of inclined surfaces joining at the top of the ridge. As illustrated in FIG. 7, the leading surface 306 as the disc rotates may be relatively long and gradual while the trailing surface 308 may be relatively abrupt. Various other configurations may be used.

The protrusions or ridges all commence at the periphery of the disc 290 but extend inward to different lengths, as shown The first protrusion 304' is short and considering the ridges in a counterclockwise fashion about the disc (FIG. 7), from ridge 304' they extend farther and farther toward the center of the disc until the last ridge 304'' extends almost to the center of the disc.

As a result of this arrangement, as the brush 282 is manually made to traverse its path from the outside of the disc toward the inside while the wheel 242 and the disc 290 are rotating, the brush encounters fewer and fewer ridges. It will be seen thus in FIG. 13, indicated in dotted lines, that the brush at an outer or slower setting will contact each one of the protrusions or ridges 304. At the position shown in dotted lines in FIG. 14, however, the brush 282 encounters only the three longest ridges 304''', 304'''', and 304''.

As described, the brush 282 is gently biased toward engagement with the disc 280 by means of the weight 284. As the disc rotates under the brush, each encounter of a ridge will normally result in an interruption in the power to the motor 226. This is because the biasing of the brush 282 toward the disc coupled with the speed of the disc does not permit the brush to follow exactly the profile or contour of the disc passing under it. Instead, after the brush 282 engages the peak of one of the ridges, it will not drop immediately down the back side 308 of the ridge but will instead gently float down to contact again with the disc in a pattern more or less like that demonstrated in FIG. 15 by solid line X.

During the time the tip of the brush, as illustrated by line X, is separated from the profile or contour of the disc, there is an interruption of the power to the motor 226. Because the disc 290 may be rotating at say 600 rpm at a setting, at which the brush encounters at least half of the ridges shown, the result may be a pulsating current to the motor of say 40 pulses per second, ignoring interruptions due to the action of the motor commutator. This illustration is simply to indicate very roughly the possible frequency of interruptions. These interruptions in effect reduce the electric power to the motor thereby resulting in a reduced speed.

Figure 14:
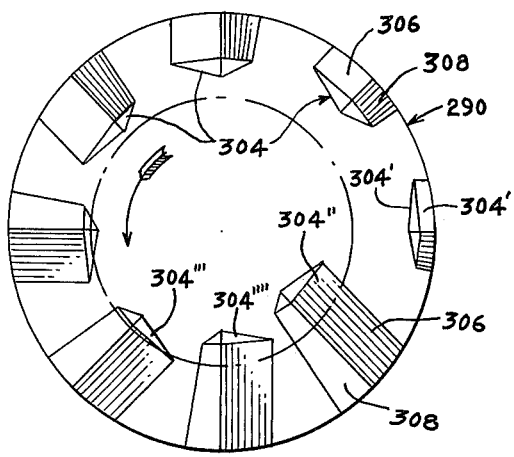
FIG. 14 is a view similar to FIG. 13 but showing in dotted lines a setting at a higher speed more comparable to the setting of FIG. 12.

When, on the other hand, the control knob 218 is turned to move the arm 272 inward to the dotted line position shown in FIG. 14, for each rotation of the disc 290, the brush 282 engages only three ridges 304 therefore interrupting the motor circuit only three times and permitting a much larger ratio of connected time to total time sharply stepping up the effective electric power to the motor and therefore increasing the speed. Obviously, were an additional diagram presented to show the brush adjacent the center of the disc 290, there would be no ridges encountered by the brush and the contact time would be total, giving maximum effective electric power and speed; hence, the movement of the arm 270 and the brush along its path of traverse over the protrusions serve to control the speed of the motor.

Figure 15:
FIG. 15 is a panoramic profile view taken on a plane of a uniform radium comparable to that developed at the dotted line of FIG. 13 and showing the path of the brush or collector relative to the surface of the disc as it rotates.
Figure 16:
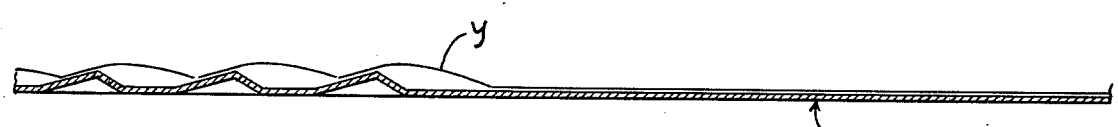
FIG. 16 is a view comparable to FIG. 15 but having its plane indicated by dotted line in FIG. 14.

In actuality, the line traced by the brush tip relative to the ridges and disc may be quite different from those presented in FIGS. 15 and 16 for illustrative purposes. It may be in FIG. 15, for instance, that the brush merely bounces along the peaks of the ridges and lands only at the plane of the disc in more inward settings such as in FIG. 16. Nevertheless, the effect is the same: the farther outward the setting, the more protrusions encountered and the less the effective electric power and speed; the more inward the fewer protrusions encountered, the more electric power and speed.

Because even at the innermost settings of the arm 272 there is some loss of power due to arcing between the arm and disc 290 and also between the disc 290 and the contacts 296, a by-pass may be provided for optimum power and speed. This, in the embodiment shown, takes place in the extreme counterclockwise position of frame 250 when the downturned ear 250b is in engagement with the upward tab 296b (FIG. 18). In this setting, the frame 250 in effect forms an electrical bridge between contacts 256 and 296 delivering total uninterrupted power to the motor.

To reduce the arcing to the disc 290 when the control is not on the by-pass setting described immediately above, a condenser may be connected across the control. The addition not only increases the effectiveness of the control by more sharply defining the momentary interruptions in current achieved by the control but also minimizes interference to radio and TV.

High among the advantages of the control described and disclosed in FIGS. 7 through 18 is that because the arm is biased toward the disc and because the disc 290 is conductive, there is no possibility of a "dead spot" stalling of the motor, or of stopping the motor while the brush is at a dead spot, as with the earlier U.S. Pat. No. 129,085 referred to above.

Figure 17:
FIG. 17 is a view comparable to FIG. 15 and illustrating in solid line the path of the brush or collector relative to the surface when the surface is proceeding as it would under light load and showing in dotted line the path of the brush or collector at the instant a significant load is applied to the mixer, reducing its speed.

The governor action of the speed control shown in FIGS. 6 through 20 is best described by reference to FIG. 17. In FIG. 17, there is represented a condition similar to that shown in FIG. 13 with a relatively slow speed setting and relatively small total contact time shown by line X. Assuming now a load is applied to the motor as would happen were the beater of the mixer shown in FIG. 7 thrust into a thick fluid mixture such as cookie dough, the speed of the motor and hence the speed of rotation of the disc 290, will be immediately sharply reduced. The result of this is that the surface speed of the disc under the brush 282 is sharply reduced. Because the time which it takes the gently biased arm to float down to the surface is reduced, much less time transpires before the contact is restored as demonstrated by dotted line Z. Because of this, the proportion of contact time to total time is steeply increased with the result of a marked increase in effective electric power to the motor. This, of course, tends to restore the speed of the motor to its set speed prior to the loading. Obviously, because the load is now on, the pattern of the brush with respect to the disc is not restored to the line X representation of FIG. 17 but to somewhere between that of the line X and the line Z.

Unlike the FIGS. 1–5b embodiment, it is a characteristic of the speed control under the FIGS. 7 through 20 embodiment that the governor action will tend to restore speed after a drop in speed at all but the highest speed settings. With the FIGS. 1–5b version, governor action is present only upon speed drops to below the speed at which the centrifugal switch closes.

As with the FIGS. 1–5b version, the rotary body may be a drum rather than a disc, the drum being equipped with outward protrusions. Also, the protrusions, rather than being more or less radial ridges, may be of more irregular nature. Additionally, the weight 284 may be replaced by an appropriate spring especially if it is desired to operate in positions at which the disc 290 is not horizontal. The same effect may be accomplished by repositioning the inner end of the spring 280 so that the spring effects the desired biasing action. Alternatively, of course, the biasing may be accomplished by providing a permanent magnet in the wheel 242 under the disc 290, for instance, to attract the arm 272 which may be of, or carry some, appropriate ferrous material.

Selection of materials for the various parts of the structures disclosed will be apparent to those skilled in the art. Obviously, hard durable materials should be selected for the disc 290 and brush 282 in that embodiment. Molybdenum has been found to be one of many materials that are suitable in this application.

FURTHER EMBODIMENT

A further embodiment of the invention is detailed in FIGS. 21 through 35. In FIG. 21, a mixer embodying the invention is generally designated 310. It comprises a plastic housing having a bottom portion 312 and an upper portion 314 including a handle 316. A control knob 318 is mounted on the top of the unit and has a shaft 320 which is journaled in a plastic hub 322 in the upper portion 314. The lower end of the shaft 320 fixedly carries an inverted cup-shaped element 323 having a recess adapted to operatively engage a spur gear 324. The portions 312 and 314 are held together by screws, not shown.

Contained within the housing is a motor 326 with an external cord, not shown, and having a shaft 328. The shaft has a spherical bearing 330, as is conventional, which rests on a plastic block 331 (FIG. 23) is held down by a strap 332. Bolts 334 are screwed into bosses 336 integrally molded with the bottom portion of the housing 312. The shaft 328 terminates in a worm gear 338 (FIG. 23) which drives a pair of worm wheels 340, 342, as is conventional. The wheels 340, 342 are integrally formed with hubs which extend down into molded journals 344 (FIG. 21). The underside of the hubs receive in driving fashion the mixer beaters (not shown), as is conventional.

Figure 33:
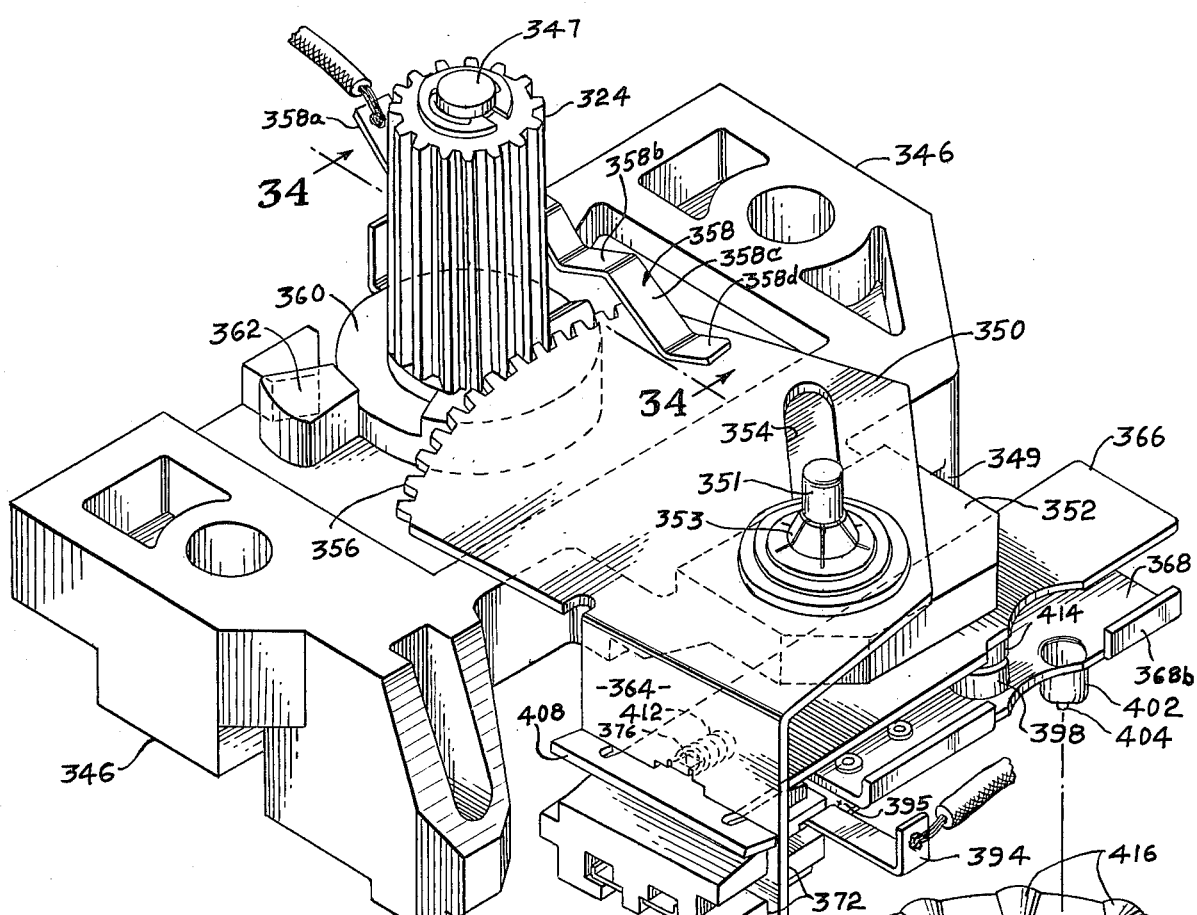
FIG. 33 is a greatly enlarged perspective view showing the speed control and governor of FIG. 21.
Figure 34:
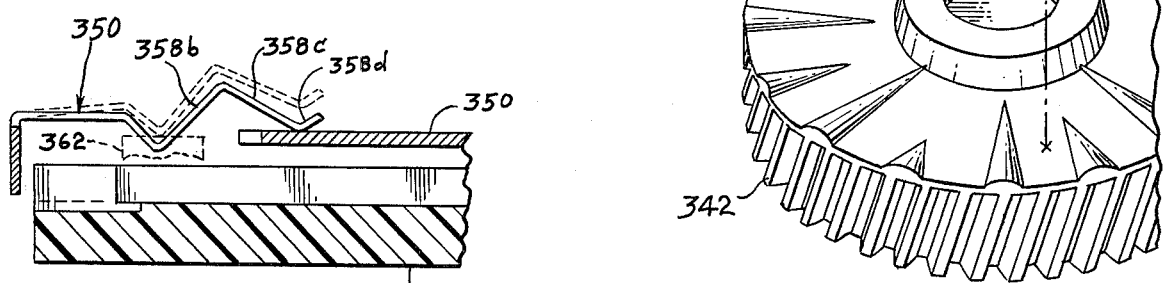
FIG. 34 is a sectional view taken on the line 34—34 of FIG. 33 and showing the actuating block and the "off" position of the contact in dotted lines.

A control support board 346 of insulating material is configured as shown in FIGS. 22 and 33, and is held in place above the wheels 340, 342 by the bolts 334 (FIG. 22) equipped with spacers 348. The board, which holds down the strap 332, is equipped with an upward shaft 347 which journals the spur gear. It is also provided with a downward element 349 over each worm wheel to hold it down against upward thrust.

Mounted for pivotal movement on the board 346 above the wheels is the brush assembly frame 350 (FIG. 22). The board 346 carries an upward pin 351 extending upward from a raised platform 352 formed on the board. The frame is formed with a slot-like opening 354 to assist in assembly in maneuvering the parts, the brush assembly frame ultimately being pivotally supported by the pin 351 at the extreme leftward end of the slot 354 (FIG. 22). A bearing washer superposes the frame 350 about the pin, and a bowed washer is disposed on the bearing washer. A standard radially split bevelled rataining washer 353 superposes the other washer, engages the pin and holds the parts snugly in firm pivotal engagement. On a margin of the frame 350 defined by an act swung out on the axis of rotation (pin 351) is a gear segment 356 which engages the spur 324. By this means, the turning of the control knob 318 pivots the frame 350 about its pin 351.

A spring contact strip 358 is secured to the block 346 by a rivet 359, and carries a tab 358a to which one of the motor winding wires is secured (FIGS. 22 and 33). The strip 358 is preferably configured as shown so that it has an upwardly inclining stretch 358b followed by a downward stretch 358c, and an upward tip 358d, the contact working surface being the engagement of the underside of the bend between portions 358c and 358d, as shown (FIG. 33). As shown best in FIGS. 22 and 33, the lower end of the spur gear 324 carries an outward annular flange 360 and a stop block 362 extending outward therefrom. The stop block 362, when the spur gear 324 is rotated counterclockwise to the extreme, slips under the contact strip 358 and raises it so that the working surface is lifted clear of the metal frame 350. In this position, the motor circuit is interrupted.

Depending from the frame 350 (FIG. 33) is a downward flange 364 which extends below the block 346 and carries the speed control contact arms 366 and 368. Both arms are supported by the flange 364. Referring to FIG. 28, the downward flange 364 is formed with a cut-out into which is received the insulating block 370. The block is formed on its side (FIG. 30) with vertical grooves 372 which receive the sides of the flange in sliding fit. The joining of the block to the flange is thus a stable one. As shown in FIG. 28, the cut-out of the flange 364 has stop shoulders 374 which serve as stops in the upward installation of the block 370. Between the shoulders 374, the cut-out of the flange provides a space above the block 370 for the insertion of the arm 366. Above the cut-out for the arm 366 (FIG. 29), there is struck out from the flange 364 an inward tongue 376.

The underside of the block 370 (FIG. 28) is formed with a longitudinal channel 378 which is undercut to provide a wider channel 380. Centrally of the channel, a downward boss 382 extends almost to the level of the downward limit of the undercut of the channel 378. Centrally of the boss is disposed a longitudinal key 384 which extends, as shown in FIG. 30, only part of the length of the block.

The contact arm 368 comprises a flexible strip portion 368a (FIG. 30) and a rigid channel-like portion 368b secured by rivets to the outer end of the flexible strip portio. As shown in FIG. 24, the strip portion 368a is bifurcated at its inward end to provide the legs 386. Between the legs is an opening 388. As shown, the portion 368a is formed at its inner end with shallow side flanges 390 (FIG. 24), and these are struck outward to form barbs at 392. Thus, the arm 368 may be inserted into the undercut portions 380 of the block 370 in a longitudinal sliding action, the arm being fully in place when the crotch of the bifurcation 388 is firmly home against the key 384 (FIG. 30). Extending outward from the arm 368 is the contact terminal 394 (FIG. 24). Outward therefrom from the block 370, the side flanges discontinue to provide a flexible portion 395. This portion is downwardly bent to give a strong downwards bias to the arm. The channel-like portion 368b carries the upward protruding electric contact 398. Struck downward from the channel-like portion 368b is a mound-like base 402 with a central nib 404 for contacting the rotary upper surfaces of the worm wheel 342 and serving as a cam follower.

As best shown in the side view FIG. 29, the upper surface of the block 370 comprises a roof-like shape having a peak edge 406 which aligns with the flange 364. The upper contact arm 366, as shown in FIGS. 23 and 33, is of T-shape and is slightly bent upward at the intersection of the T elements (FIG. 29). At the line of bend, the upper contact arm engages the peak line 406 and is held in position by the cross member of the T 408 bearing on the outside of the flange 364. The upper contact arm 366 is formed with a longitudinal cut-out which features a finger 410 directed toward the tongue 376. A compression spring 412 receives at either end respectively, the tongue and finger, and keeps the contact arm 366 in the position shown with the cross member 408 (FIG. 29) pressing against the flange 364. This pressure localizes at the contact of the upper edge of the cross member 408 where it engages the flange 364 making firm electric contact and making a decisive pivot line at the contact.

At a position aligned with the contact 398 (FIG. 27), the upper contact 366 carries the second contact 414.

The electrical connection in the motor circuit is thus made across the contacts 414 and 398. As shown best in FIG. 33, the current from the wire attached to the contact leg 358a flows through the spring contact 358 to its engagement with the brush assembly frame 350 down through the flange 364 to the upper contact arm 366 and contact 414. Thence, it flows to the engaging contact 398 on the lower contact arm, along the arm 368, and to the contact terminal 394 and onto the motor circuit. It must be observed that the lower contact arm 368 at its mounting is completely surrounded by the insulating block 370 so that to complete the circuit from the arm 366 to the terminal 394, it is necessary for the contacts 414 and 398 to be engaging. It will thus be seen that any separation of the contacts 414 and 398 will cause an interruption in the motor circuit.

It is clear from the above construction and mounting of the arms 366 and 368, that they are able to move with respect to each other. As described, the arm 368a has a strong downward bias. As a result, the nib 404 firmly engages and presses against the rotary surface of the wheel 342 so that as the wheel 342 rotates, the nib follows the contours of the portion of the surface of the wheel under it. By contrast, the arm 366 is relatively loosely pivoted. The period of the arm 366, which is rigid and pivoted in its mounting where it is entrapped in the opening above the peak 406, will depend on the weight and weight distribution of that structure and the vertical vector of the force exerted by the compression spring 412.

It will thus be seen that an impact by a protrusion on the nib 404 will cause an upward movement of the lower arm 368 (FIG. 27) as the arm flexes in portion 395 adjacent its mounting. The upward movement will, because of the physical engagement of the contacts 414 and 398, cause a corresponding upward movement of the arm 366 against the force of the spring 412 and the weight of the upper arm. Subsequently, the lower arm will return to the flat surface of the wheel 342 after the protrusion passes.

It is likely, depending on the extent of the initial impact on nib 404, that there will be some lag in the return of arm 366 to the position shown in FIG. 27 and there will thus be for an instant a separation of the contacts 414 and 398, interrupting the motor circuit. The extent and number of the interruptions have not been measured mathematically or otherwise, but it can be seen that the more protrusions encountered by the nib 404, the more interrupted time of the contacts 414 and 398. As a result, the more impacts, the slower the motor runs.

Referring to FIGS. 31 and 33, it will now be seen that the wheel 342 is formed with a large number of protrusions 416 comparable to the protrusions 304 of the FIG. 6 embodiment. It will be noted that these protrusions 416 are roughly in the form of sections of cones taken along the axis and their points extend inward from the periphery of the rotary top surface of the wheel 342 to varying degrees. It is to be noted, for instance (FIG. 31), that the protrusion 416' extends in only slightly while protrusion 416'' extends in farther, 416''' still farther, and 416'''' even farther still.

It will thus be seen that as the arm assembly moves inward toward the center of the disc 342, with the motor rotating and hence the wheel 342 rotating, the number of liftings of the nib 404 per rotation of the wheel will decrease. As a result, there will be a decrease in number of interruptions in the physical engagement; and hence electrical engagement of the contacts 414 and 398. Correspondingly, the motor will run faster the nearer the arms are to the center of the wheel. The effect approximates an infinitely variable speed control between an upper and a lower speed.

Figure 35:
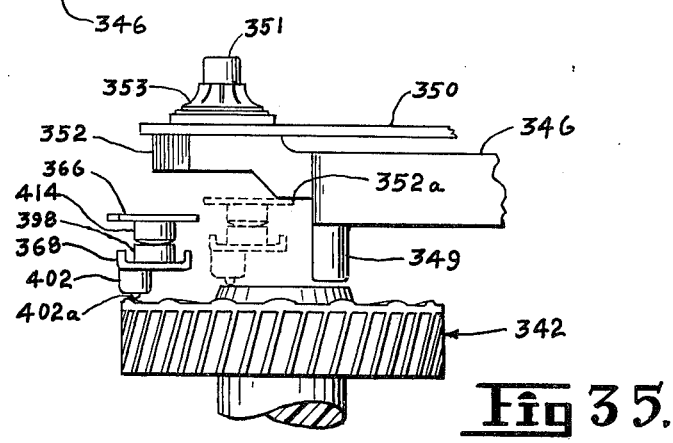
FIG. 35 is a greatly enlarged fragment of FIG. 21, showing the high speed setting of the brush assembly in broken lines.

At the inside of the wheel 342 there is a central mound which provides a plateau 418. When the brush assembly is brought inward to the center of the wheel 342 there is an upward movement of the arms as the nib 404 rides up the mount toward the plateau 418. Once the nib 404 rides on the plateau 418, there is no further lifting impact of the nib 404 and the contacts 414 and 398 engage under special pressure due to the wedging of the arms 366 and 368a in the space between the plateau 418 and the undersurface 352a of the platform (FIG. 35). This position gives maximum "togetherness" of the contacts 414 and 398, that is, firm continued engagement and hence maximum speed in the motor.

It will be understood, of course, that the means for moving the contact arms inward or outward and hence the nib inward or outward in its engagement with the rotary surface of the wheel 342, is the rotation of the frame 350 about the pin 351. This is accomplished by turning the speed control knob 318 which in turn turns the spur gear 324 to which the knob 318 is keyed by the corresponding shape of the inside of the cup 323 which receives the spur 324. As the spur rotates in turning the knob, of course, so does the frame 350 by engagement of the spur with the gear segment 356.

Hence, the turning of the knob 318 in a clockwise direction when viewed from above would cause a clockwise rotation of the spur 324 and a counterclockwise rotation of the segment 356 and, of course, the frame 350. This would cause the contact arms and the nib 404 to move inward on the wheel, increasing speed. Conversely, a counterclockwise rotation of the knob 318 when viewed from above would cause the counterclockwise rotation of the spur 324 and hence the clockwise rotation of the gear segment 356, frame 350, and the contact arms 366 and 368 and nib 404 outward of the wheel 342 toward the position shown in FIG. 22, decreasing the speed as more protrusions are encountered per rotation by the nib 404. The increasing number of liftings toward the outside of the wheel are, of course, due to the increasing frequency per revolution of the wheel of the protrusions 416.

As stated above, the exact paths of the contacts 414 and 398 have not been determined as the wheel under the nib 404 rotates, but for purposes of further illustration and not intending to limit the invention in any way, there is diagrammed in FIGS. 32a through 32c what could be typical patterns of the two contacts as the protrusions 416 are encountered by the nib 404. In FIG. 32a, for instance, which is taken at the broken line labelled "a" in FIG. 31 adjacent the periphery of the wheel 342, there are a maximum number of protrusions per rotation encountered by the nib 404. As a result, it will be seen that the path P of the contact 398 thereabove follows a corresponding lifting and returning pattern as each protrusion 416 is encountered. The path of the contact 414 P' (above in broken lines) is different because arm 366 is relatively freely pivoted. Its path reflects the weight of the arm 366 and the force exerted thereon by the spring 412.

There is thus a tendency for the contacts 414 and 398 to separate after the contact 398 reaches its peak and for the contact 414 to continue upward for a while before peaking out and then dropping back to engagement with the contact 398. Because of the presence of many of the protrusions 416 per rotation adjacent the periphery of the wheel, there are many interruptions of the circuit, the "on" time of the contacts is low, and hence slow speed is maintained. It should be clear that the path of contact 414 is shown as regular for illustrative purposes. Actually, the contact 414 may bounce along on contact 398, hitting it randomly as the wheel rotates and at each impact with contact 414 bounce upward again. Even so, the "on" time versus "on" time versus "off" time is a function of the setting of the nib 404 in its path of transverse, and there is effective speed control.

In FIG. 32b, which is taken at the same position a on the wheel 342 as 32c, there is disclosed the results of a speed drop as, for instance, upon the loading of the motor as when the beaters are suddenly thrust into a heavy cookie batter. The drop in speed will cause each protrusion, as is described in connection with FIG. 17, to have a less impact on the nib 404 so that the lifting of the contact 414 is less vigorous than under higher speed. Hence, contact 414, the path of which is designated P', returns more quickly to engagement with contact 398, the path of which is designated P. Hence, there is "togetherness" of those two contacts tending to give more "on" time and more effective power to the motor to restore its speed. The control described thus offers a governor action, particularly at lower speeds, but to some degree also at highter speeds. By togetherness is meant, of course, the engagement of the contacts 414 and 398 during a great percentage of the time per rotation.

FIG. 32c diagrams schematically, and for purposes of illustration only, a possible path of the contacts when the contact arm assembly is closer to the center of the wheel 342. Because there are fewer impacts at this point (taken at the broken line labelled c in FIG. 31), the percentage of "on" time or time of togetherness of the contacts 414 and 398 is relatively high, giving a relatively high effective power to the motor so that the speed is relatively high. The separation of the two contacts occurs because there is some inertia connected with arm 366 still in the upward direction before the upper arm 366 "peaks out" and comes back to a level at which the two contacts re-engage. It will be understood that even at this high speed there is some governor action, as described in connection with FIG. 32b, because if the speed drops as the motor encounters a sudden load, there is less of an impact as nib 404 encounters a protrusion and hence there is abrupt lifting of the upper contact and the two contacts are generally together more causing more "on" time and less interruptions than shown in FIG. 32c, for instance.

In actual practice, it has been found that the wheel 342, preferably of nylon or the like, can be integrally molded with its rotary surface and protrusions 416. It has been found also that the channel 368b of the arm 368 may have the downward mound 402 and the nib 404 drawn out of its in a simple one-piece stamping operation. The contacts 414 and 398, because of substantial arcing, are preferably of tungsten.

It should be understood that on account of the great number of advantages present in the embodiment of the invention described in connection with FIGS. 21 through 35, particularly the lesser cost, that embodiment is in many ways preferred over the embodiment described in connection with FIGS. 6 through 20.

Endless variations are possible all within the scope of expertise of one skilled in the art and all laying within the scope of the present invention which may be described in accordance with the following claim language:

I claim:

1. In a kitchen mixer having a housing, a motor in the housing, the motor having power line means and a drive shaft terminating in a worm gear, worm wheels engaging either side of the worm gear and each having a downward hub mounted in the housing for rotation, the hubs each having in their underside an upward central recess, the recesses adapted to receive respectively in driving engagement the upper ends of mixer blades; the improvement of one of the worm wheels having a rotary portion carrying a conductive element for rotation therewith, the housing also mounting brush means adapted to engage the conductive element, means for moving the brush means manually in a path of traverse along the conductive element as it rotates under the brush means, the power line means being interrupted and one end being connected to the brush means and the other end being connected to the conductive element, the conductive element being irregular in shape so that as the element rotates, the brush means is in contact with it a greater proportion of the time as the brush means approaches one end of the path of traverse than when it is adjacent the other end, whereby the speed of the motor may be varied by moving the brush means along its path of traverse.

2. A kitchen mixer as claimed in claim 1 wherein the rotary portion is a disc.

3. A kitchen mixer as claimed in claim 2 wherein the conductive element is star-shaped.

4. A kitchen mixer as claimed in claim 1 wherein switch means is provided to short out the interruption of the power line means.

5. A kitchen mixer as claimed in claim 4 wherein the switch means is a centrifugal switch which closes when the speed drops below an established minimum.

6. A kitchen mixer as claimed In claim 5 wherein the centrifugal switch comprises a conductive arm pivotally supported on a vertical shaft rising centrally from one of the worm wheels in the housing and a conductive ring is disposed about the shaft under the arm, the arm and the ring being the two elements of the switch, so that when the speed drops the arm falls to contact the ring and close the switch.

7. A motor control for an electric motor having a winding, the control comprising:
   a. interrupter means including:
      1. a surface having conductive and non-conductive segments, the surface being mounted on a rotary shaft driven by the motor, and
      2. a speed-adjusting brush movably mounted on the mixer and adapted to traverse a path in engagement with the surface while the surface is turning, the surface as it turns presenting to the brush an increasing ratio of conductive segments to non-conductive segments as the brush moves from one end of the path to the other end of the path;
   b. centrifugal switch means including:
      1. a swingable metal arm pivotally attached on a rotary vertical shaft driven by the motor, the distal end of the arm being adapted to drop as the speed of the shaft decreases below a fixed speed;
      2. a horizontally disposed stationary conductive ring concentrically surrounding the vertical shaft at a level just below the attachment of the arm to the shaft so that when the arm drops, it engages the ring, and
   c. circuit means connecting the brush and conductive segments of the interrupter means, and the arm and ring of the motor centrifugal switch means in parallel in one power line to the winding, whereby the movement of the brush of the interrupter means along its path is effective at influencing speed at or above the fixed speed, the centrifugal switch means shorting out the interrupter means below the fixed speed to avoid low torque or stalling at low speeds.

8. A motor control as claimed in claim 7 wherein the surface is a disc.

9. A motor control as claimed in claim 8 wherein theconductive segment is star-shaped.

10. A motor control for a motor of a kitchen mixer or the like having a winding, the control comprising:
   a. interrupter means including:
      1. a surface having conductive and nonconductive segments, the surface being mounted on a rotary shaft in the mixer, and
      2. a speed-adjusting brush movably mounted on the mixer and adapted to traverse a path in engagement with the furface while the surface is turning, the surface as it turns presenting to the brush an increasing ratio of conductive segments to non-conductive segment as the brush moves from one end of the path to the other end of the path;
   b. centrifugal switch means including:
      1. a swingable metal arm pivotally attached on a rotary vertical shaft in the mixer, the distal end of the arm being adapted to drop as the speed of the shaft decreases below a fixed speed;
      2. a horizontally disposed stationary conductive ring concentrically surrounding the vertical shaft at a level just below the attachment of the arm to the shaft so that when the arm drops, it engages the ring, and
   c. circuit means connecting the brush and conductive segments of the interrupter means and the arm and ring of the centrifugal switch means in parallel in one power line to the winding whereby the movement of the brush of the interrupter means along its path is effective at influencing speed at or above the fixed speed, the centrifugal switch means shorting out the interrupter means below the fixed speed to avoid low torque or stalling at low speeds.

11. A motor control as claimed in claim 10 wherein the surface is horizontally mounted on a worm wheel.

12. A motor control as claimed in claim 11 wherein the segment is star-shaped.

13. A motor control as claimed in claim 11 wherein the vertical shaft rises from the center of the disc.

14. A governor for an electric motor having a drive shaft and a winding for generating a magnetic field, and power line means delivering power to tne winding, comprising:
   a. a rotary surface driven by the shaft, the sur face being conductive and being formed with spaced protrusions;
   b. a brush assembly mounted adjacent the surface and having a brush, means biasing the brush toward the surface so that the brush normally contacts the surface but skips a portion of the surface passing under it as the brush lowers itself back to the surface after each protrusion it passes; the power line means being interrupted and one of the interrupted ends being connected to the surface and the other end being connected to the brush;

whereby if the speed of rotation of the motor drops, the brush will more closely follow the profile of the surface passing beneath it to increase the effective power and tend to restore the speed to its rate before the drop.

15. A governor for a motor as claimed in claim 14 wherein the rotary surface is a disc and the spaced protrusions are ridges which are generally radial, all of which commence at the outside of the disc and extend inward terminating at random distances in from the outside and the brush is mounted to be moved to engage the disc from the outside of the disc toward the center whereby such movement adjusts the speed of the motor, the speed of the motor increasing as the center is approached.

16. A governor for a motor as claimed in claim 15 wherein the brush assembly itself is pivotally mounted adjacent the motor about an axis parallel to the axis of the disc.

17. A governor for a motor as claimed in claim 14 wherein the brush is on an arm pivotally mounted in the brush assembly and the brush is on the distal end of the arm, and the means for biasing the brush toward the disc comprises a weight.

18. A governor for a motor as claimed in claim 16 wherein the brush assembly is made of a conductive metal and a conductive element is fixedly mounted adjacent the assembly, the said other end of the interrupted power line means being connected to the conductive element, said element being engaged by a part of the brush assembly to complete the circuit except in a position of the arm at which the arm is adjacent one end of its movement whereby at said position the motor is off.

19. A governor for a motor as claimed in claim 18 wherein a conductive body is mounted adjacent the brush assembly and comprises wipers extending down to engage the central part of the disc and a conductive tab extending upward, the brush assembly having a downward finger adapted to engage the tab when the arm is at the other end of its movement, the conductive body being connected to the said one end of the interrupted power line means, whereby at the said other end of the movement of the arm the brush assembly forms an electrical bridge between the conductive element and the conductive body to by-pass the arm and disc.

20. An electric speed control and governor for a motor having a drive shaft and a winding for generating a magnetic field therein, and power line means delivering power to the winding, comprising:
 a. a rotary surface driven by the shaft, the surface being conductive and being formed with spaced upward protrusions;
 b. a brush assembly mounted adjacent the surface and having a brush and means for moving the brush along the surface in a path of traverse, means bisasing the brush toward the surface so that the brush normally contacts the surface but skips a portion of the surface passing under it as the brush lowers itself back to the surface after each protrusion it passes, the protrusions being arranged on the surface so that the frequency of their presence under the brush on the path of traverse diminishes as the brush moves from one end of the path of traverse to the other as the surface rotates; the power line means being interrupted and one of the interrupted ends being connected to the surface and the other end being connected to the brush;
whereby the speed of rotation can be adjusted by adjusting the position of the brush on the path and whereby if the speed of rotation of the motor drops while the brush is at a given position on the path of traverse, the brush will move closely follow the profile of the surface passing beneath it to increase the effective power and tend to restore the speed to its rate before the drop.

21. A speed control and governor as claimed in claim 20 wherein the surface is a disc.

22. A speed control and governor as claimed in claim 21 wherein the protrusions are ridges commencing at the periphery of the disc and extending inward for varying distances.

23. A speed control and governor for a motor as claimed in claim 21 wherein the disc is horizontally disposed, the brush is on a pivoted arm on the assembly, and carries a weight at its distal end comprising the biasing means.

24. A speed control and governor for a motor as claimed in claim 23 wherein the pivot connection between the arm and the assembly is formed by a tongue on the inner end of the arm extending into a slot in the brush assembly, and spring means urges the arm and the portion of the assembly about the slot into good electrical contact.

25. A speed control and governor as claimed in claim 20 wherein the brush assembly is pivotally mounted and the position of the brush on the path is adjusted by pivoting the assembly, and at one end of the path the connection between the said other interrupted end and the brush is broken to turn the motor off.

26. A speed control and governor as claimed in claim 20 wherein the recited structure is disposed in a mixer housing, the drive shaft of the motor terminates in a worm gear engaging a pair of worm wheels adapted to drive a pair of mixer blades, and the surface is a disc mounted on the top of one of the wheels.

27. A speed control and governor as claimed in claim 20 wherein the brush and rotary surface are of molybdenum.

28. In a food mixer having a housing, a motor in the housing, the motor having power line means and a drive shaft carrying a worm gear, a worm wheel engaging the worm gear and having a rotary surface portion and a hub and being mounted in the housing for rotation, the hub having coupling means adapted to receive in driving engagement the upper end of a mixer blade; the improvement including speed control means having make-and-break circuit means connected in series with the motor power line, the speed control means including:
 a. a brush assembly comprising at least part of the make-and-break cricuit and having an engagement portion;
 b. means for moving the brush assembly manually so that the engagement portion defines a path of traverse along the rotary surface portion;
 c. irregularly-shaped means carried by the rotary surface portion and adapted to be engaged by the engagement portion, the irregularly-shaped means being so shaped that while the rotary surface portion rotates the engagement portion is in engagement with the irregularly-shaped means a greater portion of the time as the engagement portion approaches one end of the path of traverse than as it approaches the other end,
whereby the make-and-break circuit means completes the motor circuit more of the time when the engagement means is toward the said one end than toward the said other end.

29. A governor for an electric motor having a drive shaft and a winding for generating a magnetic field, and power line means delivering power to the winding, comprising:
 a. a rotary surface driven by the shaft, and being formed with spaced protrusions;

b. a brush assembly mounted adjacent the surface and having a brush, the brush including a pair of normally substantially parallel arms with cooperating contacts in series with the winding, the first arm closer the surface having an engagement portion resting on the rotary surface, means biasing the arms toward contact-to-contact engagement so that the contacts normally engage but when a protrusion passes, the first arm lifts the other arm but lowers more rapidly than the other arm so that the contacts are interrupted for a period of time, whereby if the speed of rotation of the motor drops, the other contact will more closely follow the contours of movement of the first contact to increase the effective power and tend to restore the speed to its rate before the drop.

30. A governor for a motor as cliamed in claim 29 wherein the rotary surface is a disc and the spaced protrusions are ridges which are generally radial, all of which commence at the outside of the disc and extend inward terminating at random distances in from the outside and the brush is mounted to be moved to engage the disc from the outside of the disc toward the center whereby such movement adjusts the speed of the motor, the speed of the motor increasing as the center is approached.

31. A governor for a motor as claimed in claim 30 wherein the brush assembly itself is pivotally mounted adjacent the motor about an axis parallel to the axis of the disc.

32. A governor for a motor as claimed in claim 29 wherein means are provided to urge the first arm toward the surface so that the engagement portion closely follows the contour of the rotary surface beneath it and means are provided to gently bias the other arm toward the first arm.

33. A speed control and governor for an electric motor having a drive shaft and a winding for generating a magnetic field therein, and circuit means delivering power to the winding, comprising:
 a. a rotary surface driven by the shaft, the surface being formed with spaced upward protrusions;
 b. a brush assembly mounted adjacent the surface and having a brush comprising a pair of generally parallel contact arms, the arms carrying cooperating contacts in series with the winding, and means for moving the arms along the surface in a path of traverse, means biasing a first arm closer the surface strongly toward the surface, the first arm having an engagement portion engaging the surface and following its contours as it rotates and means gently biasing the other arm toward the first arm so that the contacts normally engage, the first arm raising and lowering as a protrusion passes, but the other arm lowering more slowly than the first arm to cause a disengagement of the contacts, the protrusions being arranged on the surface so that the frequency of their presence under the brush on the path of traverse diminishes as the brush moves from one end of the path of traverse to the other as the surface rotates;

whereby the speed of rotation can be adjusted by adjusting the position of the brush on the path and whereby if the speed of rotation of the motor drops while the brush is at a given position on the path of traverse, the brush will more closely follow the profile of the surface passing beneath it to increase the effective power and tend to restore the speed to its rate before the drop.

34. A speed control and governor as claimed in claim 33 wherein the surface is a disc.

35. A speed control and governor as claimed in claim 34 wherein the protrusions are ridges commencing at the periphery of the disc and extending inward for varying distances.

36. A speed control and governor for a motor as claimed in claim 34 wherein the disc is horizontally disposed, and the other arm is pivoted on the assembly.

37. A speed control and governor for a motor as claimed in claim 36 wherein the other arm is of T-shape and the pivot connection between the other arm and the assembly is formed by a slot in the assembly and the stem of the T extending therethrough with the crosspiece of the T engaging the assembly in electrical contact, and spring means urges the stem of the T away from the slot of the assembly.

38. A speed control and governor as claimed in claim 33 wherein the brush assembly is pivotally mounted and the position of the brush on the path is adjusted by pivoting the assembly, and at one end of the path the connection between the motor and the brush is broken to turn the motor off.

39. A speed control and governor as claimed in claim 38 wherein the disc has a central mound and plateau so that as the brush is brought inward of the disc it rides up on the plateau and causes the contacts to make firm engagement for maximum "on" time.

40. A speed control and governor as claimed in claim 39 in which stationary structure means of the control is closely spaced above the plateau so that the brush when riding on the plateau is compressed between the structure means and the plateau to cause the compressive engagement of the contacts.

41. A speed control and governor as claimed in claim 33 wherein the recited structure is disposed in a mixer housing, the drive shaft of the motor terminates in a worm gear engaging a pair of worm wheels adapted to drive a pair of mixer blades, and the surface is a disc mounted on the top of one of the wheels.

* * * * *